United States Patent Office 3,297,485
Patented Jan. 10, 1967

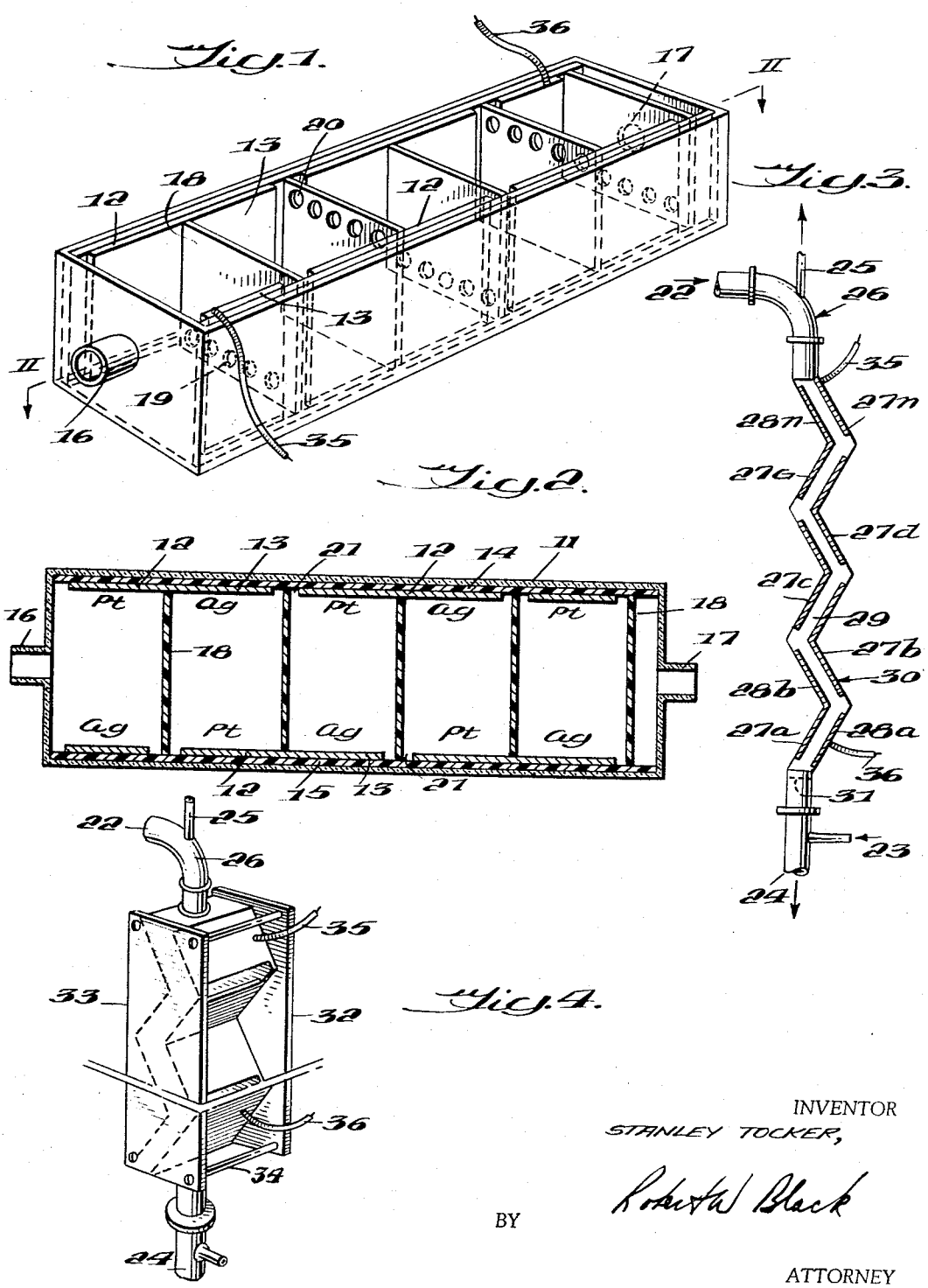

3,297,485
CASCADE BATTERY
Stanley Tocker, Wilmington, Del., assignor to E. I. du Pont de Nemours and Company, Wilmington, Del., a corporation of Delaware
Filed Apr. 26, 1963, Ser. No. 275,976
8 Claims. (Cl. 136—86)

This invention relates to batteries and more particularly to cascade batteries having a plurality of alternating anodes and cathodes supported on dielectric members.

For the most part, efforts in fuel cell technology are directed toward development of portable fuel cells to make use of their high efficiency in power production for mobile application. Relatively little attention has been directed toward the development of stationary power sources which can utilize abundant low-cost fuels, such as oxidizable industrial and municipal wastes. The adaptation of fuel cells to this type of fuel would not only provide a cheap source of power, but also would aid in rendering such noxious wastes harmless.

The cost of presently available fuel cells adaptable to this use makes this power source and method of handling wastes economically unattractive. The cost is largely a result of corrosive conditions which exist, requiring expensive materials of construction. For example, if base metals or metals other than the electrode metals are used, local cell reactions occur which cause erosion and ultimately render the equipment inoperable. Another obstacle to the adaptation of presently available fuel cells to the utilization of these sources of fuel is that present designs are not especially suitable for use with fuels in which oxidizable species are present in low concentrations.

It is, therefore, an object of this invention to provide fuel cell batteries which can be adapted to use large volumes of low-cost fuels.

It is a further object of this invention to provide fuel cell batteries wherein the corrosive actions of electrolytes, fuels and oxidizers are minimized.

These and other important objects and advantages of the invention will become apparent as the same is more fully understood from the following description, which, taken in connection with the accompanying drawings, discloses preferred embodiments of the invention wherein:

FIGURE 1 is a perspective view of a cascade battery constructed according to the present invention showing the perforated baffles in relation to the rest of the battery;

FIGURE 2 is a top cross-sectional view taken along line II—II of FIGURE 1;

FIGURE 3 is an embodiment of the invention which employs a rising gaseous stream countercurrent to a falling liquid stream; and, FIGURE 4 is a perspective view of the embodiment shown in FIGURE 3 illustrating how end plates are used to support the zigzag structure.

The present invention satisfies the objectives set forth by providing a battery of cascaded fuel cells of simple construction, which makes highly efficient use of costly electrode metals, can employ fuels in low concentrations, and is subject to substantially none of the adverse effects of corrosion. These objectives are accomplished by means of an electrode structure wherein the anode and cathode materials are deposited on dielectric supports which line a channel through which the fuel and oxidizer flow. Baffle means are provided to assure turbulence to increase contact of fuel and oxidizer with the electrodes, and aid in depolarization. The fuel and oxidizer can be supplied in a stream together at one end of the battery, or the oxidizer in the form of a gas can be a countercurrent stream for greater efficiency.

The characteristic cascade structure of this battery is illustrated in FIGURES 1 and 2, wherein the fuel flows through all cells of the battery in sequence. In this embodiment the battery takes the form of trough-like supporting frame enclosure 11, with thin film electrodes 12 and 13 positioned on dielectric support members 14 and 15, which can be integral with enclosure 11, each forming a side wall, or they can be inserted into the enclosure as subassemblies.

In a preferred embodiment of this invention, an aqueous system containing fuel and oxidizer, along with any required electrolyte, are supplied at inlet 16 and combustion products are exhausted at outlet 17. To provide for turbulent flow through the battery, and to increase the contact between the fuel-oxidizer-electrolyte mixture and the electrodes and promote depolarizaiton, baffles 18 are positioned between the cells as shown in FIGURES 1 and 2. These baffles, which are of an electrical insulating material, provide first a channel 19 for flow of electrolyte, fuel, etc., near the bottom of the battery enclosure, with a channel 20 near the top of the enclosure at the next cell baffle. While baffles in the cell illustrated are near the boundaries of individual cells, a larger number of baffles with channels alternating from the upper to lower extremities, side to side, or of any other configuration to increase turbulence can be used.

As illustrated in FIGURE 1, anode material 12, on support 14 contacts cathode material 13 to provide a series electrical connection between the first and second cell; this arrangement is followed in all cells of the battery. Narrow separations or spaces such as at 21, which contain no electrode or conductive material, are provided between separate cells. Thus, the cathode of one cell is coupled directly to the anode of the next cell, thence the electric current path is through the electrolyte present in the cells to the cathode of the second cell.

A particular characteristic of the present invention is that the anode and cathode are relatively thin coatings on an electrically insulating support. Typical electrode materials employed include a platinum cathode and a silver anode, each deposited on a thermoplastic organic film, for example, a film of polyethylene terephthalate, or of polyvinyl chloride. However, vitreous inorganic materials such as ceramics or glass have been found convenient as supports where the electrodes form one of the walls of the vessel. Alternatively, nickel can be substituted for platinum where relatively large electrodes are required and the expense of platinum is prohibitive for a function which is largely electrical conduction. If nickel electrodes are used, a small quantity of platinum can be deposited on the surface to provide better catalytic effects.

The electrolyte can be mixed with the liquid stream containing the fuel and oxidizer, however, if no solids are present in the fuel-oxidizer system it has been found satisfactory to use a porous ion exchange resin bed as the electrolyte.

A preferred embodiment of the present invention is illustrated in FIGURE 3. This embodiment is particularly adapted to the use of a gaseous reactant which is utilized in a stream which is countercurrent to the other reactant dispersed or dissolved in an aqueous system. In this embodiment of the cascade battery, the fuel dispersed in a liquid is supplied at inlet 22 at the upper end of said battery cells, and is ion exchange resin electrolytes are not used, a suitable electrolyte is dissolved in the aqueous system. The gaseous oxidizer is supplied at inlet 23 at the bottom of said cells and flows upward through the column. The liquid effluent is exhausted at outlet 24 and excess gaseous oxidizer is exhausted at outlet 25, which is positioned at elbow 26 to aid in separation of the gas from the aqueous stream.

The particular advantage of this embodiment is derived from the placement of the cathode of the cells using a gaseous oxidizer and a liquid fuel or a fuel dispersed in a liquid. The anodes of an alternating anode-cathode sequence on the walls, such as that disclosed in FIGURE 1, are positioned so that they are on the upper side of each slanting cell as shown in FIGURE 3 by anodes 27a, 27b, 27c . . . 27n. According to this arrangement the gas, which is usually oxygen, due to its low density, will preferentially pass near the proper electrode enabling maximum efficient use of gaseous reactants in combination with reactants in the liquid phase. The cathodes 28a, 28b, 28c . . . 28n are positioned on the opposite side of the cell channel 29, which, if the nature of the stream permits (i.e., no solids), is preferentially packed with a granular or fibrous hydrated ion exchange resin, which is retained in substantially vertical column 30 by screen 31.

For simplicity of illustration, the detail of the insulating support has been omitted from the drawing, but it is understood that the substantially parallel supports in the disclosure pertaining to FIGURE 1 are satisfactory. However, adequate provisions must be made for sealing side walls to the cells.

FIGURE 4 illustrates in perspective a cascade battery employing the vertical zigzag column embodiment in which side walls 32 and 33 are held in place by bolts 34. Leads 35 and 36 couple the terminal anode and cathode to an external utilization circuit in all figures.

A cascade fuel cell battery as illustrated in FIGURE 1 is constructed as follows:

Two one inch wide, five inch long strips of unplasticized polyvinyl chloride films are coated with regular alternate bands of silver and platinum in the configuration as hereinbefore described and illustrated by FIGURE 1, by a process of cementing very thin foils of the metals to the film. (An electroless plating process based on the method initially described by G. Riddell, J. Research, National Bureau of Standards, 39, 1947 can also be used.) Silver foil can be used for both electrodes, in which case the anodes are platinized by electro-deposition of platinum from a 1% aqueous solution of chloroplatinic acid containing about 0.05% lead acetate. Electrodes, so prepared for five cells, are approximately 0.05 mil thick on 2 mil film. Each of the two electrode assemblies, with leads attached above the electrolyte level by means of a conductive cement, is clamped along opposite vertical sides of a rectangular glass trough, which is provided with inlet and outlet tubes at the ends. Baffles of rigid polyvinyl chloride film, with alternating upper and lower channels in the form of perforations, are inserted between the cells. A single dissolved fuel consisting of 5 ml. methanol, 10, ml. 30% aqueous hydrogen peroxide and 90 ml. aqueous potassium hydroxide (20–25%) is passed through the battery at 0.1 ml./sec. The immersed dimension of each platinum electrode is 5 sq. cm. The output of the battery under these conditions is:

2.25–2.50 volts open circuit
0.52 volt at 460 ma.
1.2 volt at 305 ma.

The advantages of this invention over devices previously known to the art can be classed under those pertaining to the electrode structure and those pertaining to the assembled battery structure. The electrode structure provides a convenient, relatively low-cost means of assembling the electrode; the insulating support enables the use of only that amount of metal required for electrical and catalytic functions need not be self-supporting and is not subject to corrosive actions. The disposition of the electrode materials on the support provides a simplified structure adapted to machine production by vapor deposition methods of metallization.

The cascade flow structure enables the use of low concentration of fuels in an aqueous solution, with assurance of relating high conversion of the fuel in successive cells.

The structure enables the use of dissolved electrolytes or fixed bed ion-exchange electrolytes. The alternate positioning of anodes and cathodes on each side of the fuel stream facilitates contact of the fuel and oxidizer of the stream with the appropriate electrode. The entire assembly, providing a series coupling of electrodes with the addition of voltages from a single fuel stream overcomes the disadvantages of the low voltages inherently obtainable from fuel cells.

What is claimed is:

1. A cascade battery comprising: a plurality of series disposed cells; means for supplying a fuel stream from an external source to said cells; means for supplying an oxidizer from an external source to said cells; electrolyte means present in said cells and electrode means, said electrode means being at least two electrical insulating support members disposed along opposite sides of said cells, each of said support members having positioned thereon an alternating series of thin film anodes and thin film cathodes, said anodes and cathodes in each series disposed alternately in electrical contact and out of contact, said electrodes providing an electrical series from side to side of the flow path of said fuel stream which includes an anode, fuel and electrolyte, a cathode, a second anode, fuel and electrolyte, a second cathode and thus to the final cathode of said battery.

2. The battery of claim 1 wherein the insulating support members are organic films.

3. The battery of claim 1 wherein the insulating support members are a vitreous inorganic solid.

4. The battery of claim 1 wherein the electrolyte means is a dissolved electrolyte flowing with said fuel stream through said cells.

5. The battery of claim 1 wherein the electrolyte means is a porous hydrated ion exchange resin.

6. A cascade battery comprising: a plurality of series disposed cells; an inlet to the first cell of said series of cells for supplying a liquid stream containing a fuel and an oxidizer; an outlet at the end of said series of cells for exhausting said stream; an electrolyte present in said cells; two substantially parallel electrical insulating organic film support members disposed along the long axis of said cells, each of said support members having positioned thereon electrodes which are an alternating series of thin film anodes and thin film cathodes, said anodes and cathodes in each series disposed alternately in electrical contact and out of contact, said electrodes providing an electrical series transverse to the flow path of said fuel stream which includes an anode, fuel and electrolyte, a cathode, a second anode, fuel and electrolyte, a second cathode and thus to the final cathode of said battery and a series of baffles transversely disposed between said film support members at the points where said anodes and cathodes are in electrical contact and out of contact, said baffles having channels to provide for turbulent flow through said battery.

7. A cascade battery comprising: a plurality of substantially vertical series disposed cells; an inlet at the upper end of said series of cells for supplying a liquid stream containing a fuel; an inlet at the lower end of said series of cells for supplying a gaseous oxidizer; an outlet at the upper end of said series of cells for exhausting excess gaseous oxidizer; an outlet at the lower end of said series of cells for exhausting said liquid stream; an electrolyte present in said cells; two substantially parallel electrical insulating organic film support members defining a zigzag path along the long axis of said cells, each of said support members having positioned thereon electrodes which are an alternating series of thin film anodes and thin film cathodes, said anodes and cathodes in each series disposed alternately in electrical contact and out of contact with said anodes positioned on the upper side of each cell in said zigzag path, said electrodes providing an electrical series from side to side of the downward flow path of said fuel stream which includes an anode, fuel and electrolyte, a cathode, a second anode, fuel and electrolyte, a second cathode and thus to the final cathode of said battery.

8. An electrode unit adapted for use in a battery employing an electrolyte comprising: at least two electrical insulating support members constructed and arranged to maintain a flow path therebetween; an alternating series of thin film anodes and thin film cathodes positioned on each of said support members, said anodes and cathodes in each series disposed alternately in electrical contact and out of contact and providing an electrical series from side to side of the flow path which includes an anode, conductivity across said flow path, a cathode, a second anode, conductivity across said flow path, a second cathode and thus to the final cathode of said battery.

References Cited by the Examiner
UNITED STATES PATENTS

| | | | |
|---|---|---|---|
| 409,366 | 8/1889 | Mond et al. | 136—86 |
| 1,541,947 | 6/1925 | Hartman et al. | 204—268 |
| 1,908,886 | 5/1933 | Brandt | 204—268 |
| 3,216,911 | 11/1965 | Kronerberg | 136—86 |

WINSTON A. DOUGLAS, *Primary Examiner.*

A. B. CURTIS, *Assistant Examiner.*